April 29, 1941.  C. N. CROSS  2,240,209
DISPLAY MOUNT
Filed April 13, 1939  2 Sheets-Sheet 1

Inventor
C. N. CROSS
By
Attorney

April 29, 1941.   C. N. CROSS   2,240,209
DISPLAY MOUNT
Filed April 13, 1939   2 Sheets-Sheet 2
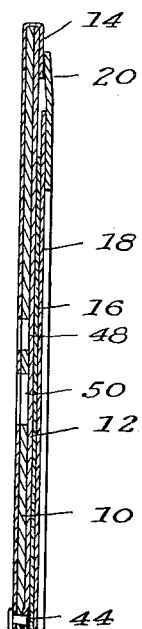
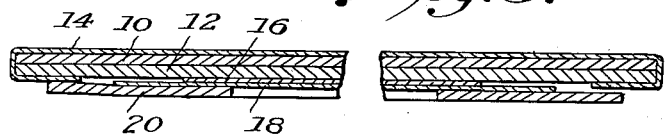
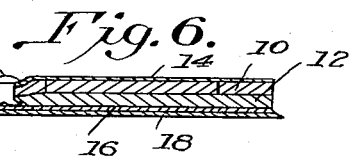
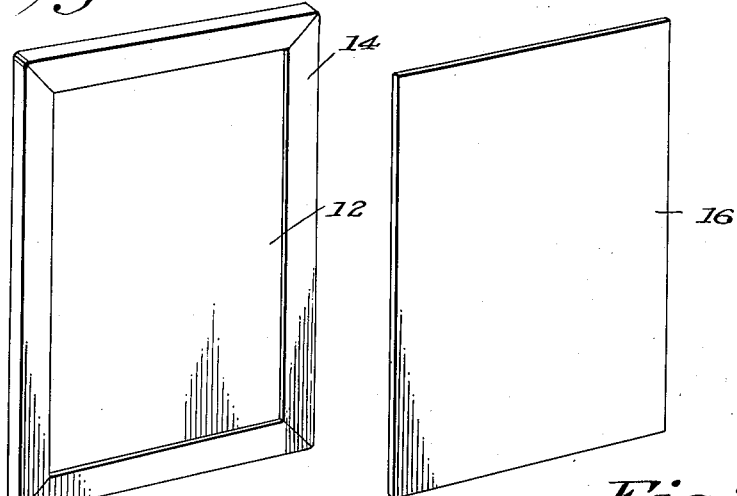
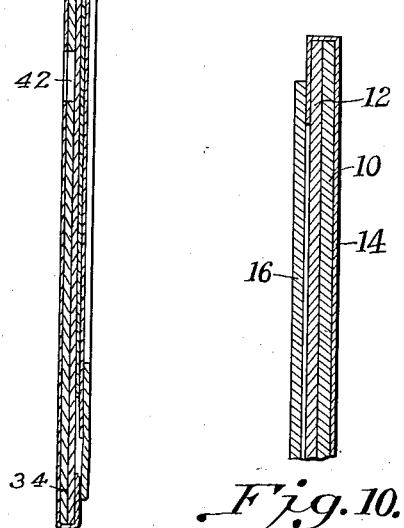
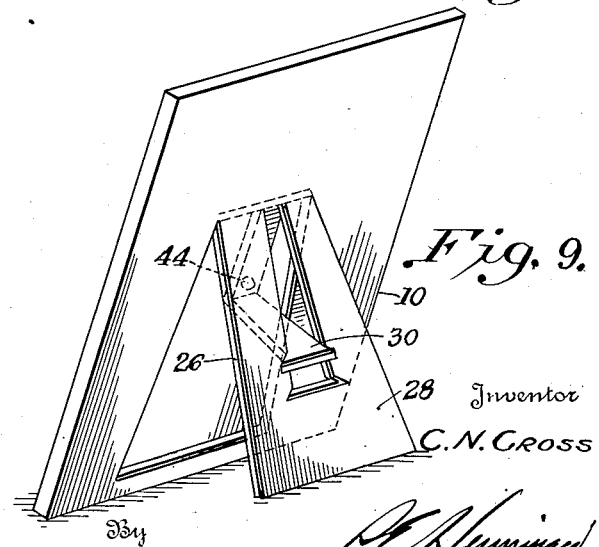
Inventor
C. N. Cross
By
Attorney Patented Apr. 29, 1941

2,240,209

UNITED STATES PATENT OFFICE 2,240,209

DISPLAY MOUNT

Carroll N. Cross, Middleboro, Mass.

Application April 13, 1939, Serial No. 267,712

5 Claims. (Cl. 40—152.1)

This invention relates to display mounts of which the novel features and advantageous characteristics will be particularly described hereinbelow. This invention, while illustrated and described in its application to picture mounts, is applicable to many kinds of display purposes in which a wide variety of objects and materials form the subject of the display.

It has in the past been difficult to construct satisfactory display mounts, particularly of the picture display class in connection with which this invention is illustrated while using lightweight flexible materials. The primary difficulty encountered has been the tendency of such mounts to warp so badly that their continued use became impossible. In my Patent No. 2,092,348, granted to me September 7, 1937, I have disclosed a picture mount construction composed of a plurality of lightweight mount members relatively loosely superimposed upon each other and bound together by means of a flexible binding member passing over the marginal edges of the several members constituting the mount base. This construction eliminated the bad effect of stress placed on the mount by the insertion and enclosure of a picture, thereby overcoming the serious objections to the former mounts which had the tendency to warp out of shape.

It is an object of this invention to further improve display mount constructions to make possible the construction of display mounts of lightweight flexible materials while at the same time imparting to such constructions greater strength and greater resistance to warping than those mounts of my prior patent.

It is a further object of this invention to combine in a display mount a supporting member or easel which may be folded into the plane of the back of the mount so as to occupy little space and permit a large number of mounts to be stacked upon each other with ease. A construction such as here suggested will permit stacking of a large number of mounts for the purpose of seasoning and storing without any danger of mount warping such as is now inherent in mounts of the present easel attached type.

In its broadest aspects, the invention consists of two members of substantially equal size which are bound together along their marginal edges to provide support for a picture or other object to be displayed. In this respect this invention differs from that disclosed in my prior patent by the provision of a supplementary or intermediate supporting member having an unbroken surface and having no passages extending therethrough which might weaken the construction.

The further objects and advantages of the invention will become apparent as the description of an illustrative embodiment thereof is read in connection with the drawings forming a part hereof. In the drawings like reference numerals indicate like parts throughout the several figures, and:

Figure 4 is a longitudinal sectional view taken on line 4—4 of Figure 3;

Figure 5 is a broken transverse sectional view taken on line 5—5 of Figure 2;

Figure 6 is a transverse sectional view taken on line 5—5 of Figure 2 to show the construction of the portion broken from Figure 5;

Figure 7 is a perspective face view of a modified form of the invention;

Figure 8 is a perspective face view of a picture or the like adapted to be attached to the face of the mount illustrated in Figure 7;

Figure 9 is a rear perspective view of the modified form of the invention; and

Figure 10 is an enlarged vertical sectional view through the upper portion of the modified form of the invention.

Figure 1:
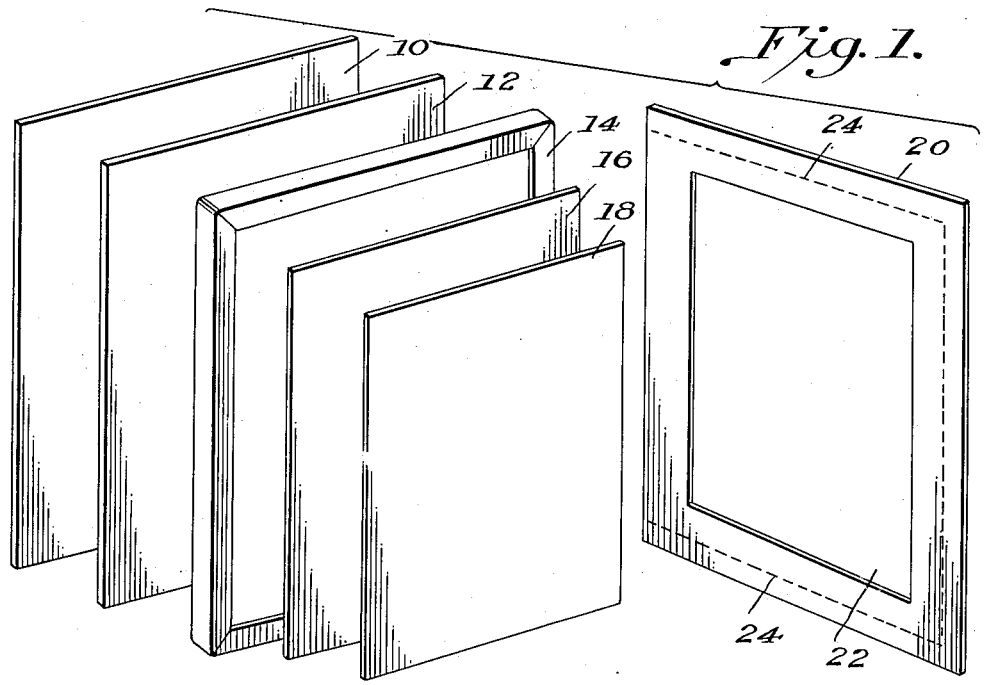
Figure 1 is an exploded view of one form of picture mount in which the invention is embodied.
Figures 2, 3:
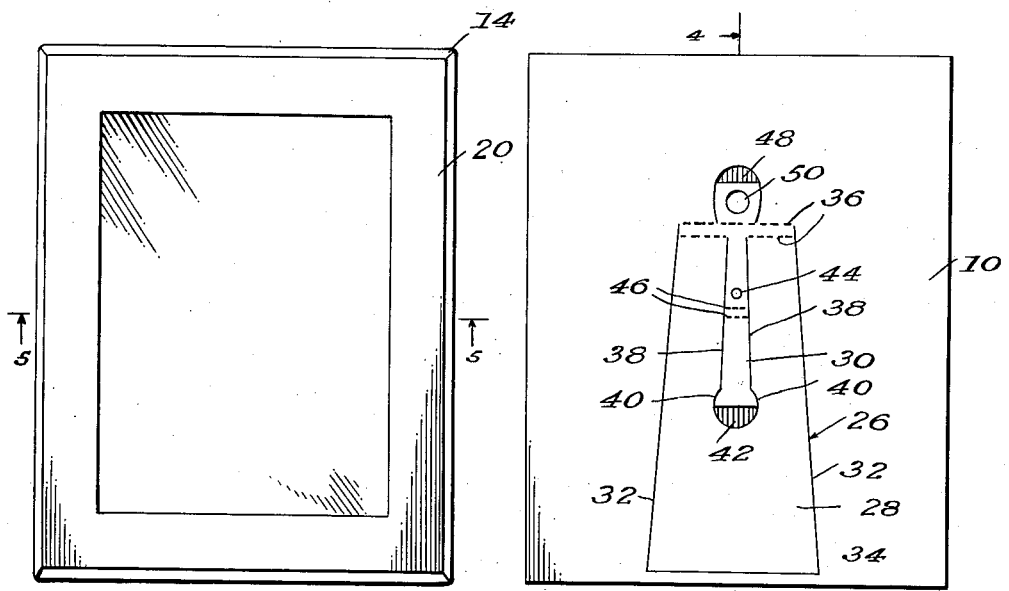
Figure 2 is a face view of the mount of Figure 1.
Figure 3 is a back view of the mount of Figure 1.

All of the individual elements of the preferred form of my mount are shown in Figure 1 of the drawings, wherein a backboard 10 is provided. The backboard 10 determines the external dimensions of the mount and is formed of any suitable material but preferably of a lightweight paper or cardboard stock having sufficient thickness and strength to be self-sustaining. A second or intermediate member 12, coextensive in size with the backboard 10 and conveniently constructed of the same material as the backboard, is superimposed upon the backboard 10 and these two members are bound together about their marginal edges preferably by means of a flexible binding member 14.

The binding member 14 may be in the form of a flexible sheet which extends over the entire rear face of the backboard 10, over the marginal edges of the backboard and the intermediate board 12 and onto the face of the board 12, as best shown in Figure 4. However, the binding member 14 may be applied in any other manner, such as by having the edges thereof terminate on the rear face of the backboard 10. The exact manner of applying the flexible binding member 14 forms no part of this invention and the practice of the invention is in no way dependent on the particular manner in which the binding member 14 is applied so long as the same fills its function of joining the backboard 10 and the intermediate board 12 along their marginal edges, and so long as the same effectively seals these edges against the passage of dirt or other foreign matter.

A picture, photograph, or other device to be mounted for display is indicated at 16. A transparent covering member such as glass, Celluloid, or any other suitable transparent medium 18 may be provided for the protection of the face of the photograph 16, but this is not essential.

A faceboard 20 having a picture display window 22 therein is suitably attached to the face of the intermediate member 12 after the same has been bound to the backboard 10 as hereinabove described. The faceboard 20 may be attached to the intermediate member 12 in any suitable manner as, for example, by gluing the same to the face thereof. The faceboard 20 may be of the same size as the superimposed boards 10 and 12, but I prefer to make the same somewhat smaller than these boards so that after the faceboard has been fixed in position, a narrow marginal border of the bound boards 10 and 12 extends beyond the four marginal edges of the faceboard. In the preferred form of the invention, the faceboard 20 is glued to the face of the superimposed boards 10 and 12 along three sides thereof as indicated in the dotted lines 24, leaving a third vertical edge unsecured for the purpose of admitting a photograph 16 and, if desired, a transparent member 18. The manner in which the faceboard is attached is not an essential part of this invention because it is obvious that the same may be fixed to the base members along any two or three sides, or along all four sides as may be desired. In any event, the faceboard 20 serves the function of retaining the picture and its transparent protective medium in position against the sustaining boards 10 and 12 and serves the further important function of concealing the free edges of the binding member 14 which may terminate on the face of the intermediate sustaining board 12.

In accomplishing one of the important features of the invention I have provided the backboard 10 with means for supporting the mount in display position. This means, in its preferred form, comprises an easel member which may be securely held in one or a variety of different positions of adjustment and which, when not in use, may be folded into the plane of the backboard from which the same is formed. The easel 26 comprises a leg 28 and a tapered locking tongue 30 formed in the backboard 10. The leg or supporting member 28 is formed by cutting the backboard 10 on lines 32 which diverge from a point above the center line of the backboard to a point near the bottom thereof. The lines 32 are joined by a line 34 which is cut through the material of the backboard 10 at a point above the lower marginal edge thereof and in a direction parallel thereto. The leg or supporting member 28, is thus formed to permit the same to be moved outwardly about score line 36 which constitutes the pivot point for the lug 28.

The locking tongue 30 is formed by cutting the material on a pair of upwardly converging lines 38 which preferably terminate at a point below the top of the easel, and by further cutting said material at the bottom of said lines to provide the locking tongue 30 with a free end.

The free end of the tongue 30 is formed with laterally projecting shoulders 40 which abut the face of the leg or supporting member 28 when the same have been moved to open position. The leg or supporting member 28 is cut away adjacent the end of the tongue 30, as shown at 42, to provide a finger-hold to facilitate manual manipulation of the tongue.

The tongue 30 is attached to the intermediate board 12 by means of a rivet 44 which passes through the tongue and through the intermediate board 12. Immediately below the rivet 44 are score lines 46 which permit free movement of the tongue 30 in an outward direction.

The particular construction of the easel member 28 and its locking tongue 30 may be varied within wide limits because the invention herein lies in a picture mount having an easel which is foldable into the plane of the back of the mount, and not in the specific form of the easel members. The easel member 28 may be cut from the backboard 10 along parallel lines which may extend to the very bottom margin of the backboard, for example.

When it is desired to place the mount in a position so that a picture or the like held therein may be displayed, the tongue 30 is swung away from the backboard 10 by moving the same rearwardly about the score lines 46. The leg or supporting member 28 is then moved rearwardly until the rear face thereof comes in contact with the tongue shoulders 40 which serve to limit its rearward movement, or until the edges of the tongue 30 functionally engage the sides of the cooperating slot in the leg member.

It is evident that the construction provides a mount easel which embodies a minimum of structural details and one which provides a positive lock for the leg or supporting member when the same is moved to the open position. This latter advantage is secured by reason of the converging slot from which the tongue 30 is cut. Consequently when the easel is open and the mount is subjected to shock of any kind, the sides of the tongue 30 will be driven into tighter engagement with edges of the slot defining the tongue.

A hanger member 48 having a pinhold 50 therein may also be provided in the backboard 10. This member may be swung away from the backboard 10 on the upper of score lines 36.

In the modified form of my invention shown in Figures 7 to 10, there has been eliminated the faceboard 20, and this form of the invention is adapted to have a picture 16 or the like attached to the face thereof by an adhesive or by the inserting of the corners of the picture into slots formed in the face of the mount, or by means of attached corner holders. These ways of mounting photographs constitute popular methods to which the modified form of my mount is particularly adapted. In the modified form of the invention, the picture or photograph 16 itself fills one of the functions exercised by the faceboard 20 of the preferred form of the invention. In this connection it may be noted that the edges of the binding member 14 are brought inwardly on the face of the intermediate board 12 sufficiently far so that the photograph or the like 16 will extend over these exposed edges and conceal them without difficulty.

The function of the board overlying the backboard, whether it be the second board 12 in Figures 1-6, or the intermediate display supporting board 12 of Figures 7-10, is of particular importance. In a construction which involves a supporting strut formed from the backboard of a mount, together with a locking tongue for such strut, there is created an inevitable pressure which bears against the locking tongue by reason of the inherent resilient action of the supporting strut which forces the locking tongue toward the supporting surface of the mount. The board 12 is provided to receive and withstand the thrust of the locking tongue 30. In constructions which utilize no board such as 12, the tongue thrust is exerted directly against the back of a picture carried by the mount which is undesirable. As an alternative, the tongue may be made to bear against the backboard, but in such constructions, the back surfaces will not lie in the same plane, which is an important object of the invention.

While many minor modifications may be made within the spirit of this invention, it will nevertheless appear that an essential feature thereof is the provision of a construction wherein the back or supporting member is not weakened by placing large picture inserting openings therein. Furthermore, the provision of the intermediate supporting member 12 and its connection with the backboard 10 provides a construction, which, even if made from very light stock, almost totally eliminates the tendency to warp.

It is to be understood that the invention may be embodied in a number of forms and that the two herein shown are for the purpose of illustration only, and that the practice of the invention shall be limited only by the scope of the subjoined claims.

What I claim is:

1. In a display mount or the like constructed of lightweight flexible stock, a backboard, a second board lying over the face of said backboard, means joining said boards at at least two sides thereof, a unitary mount supporting easel member formed in said backboard for angular movement bout a line integrally joining said backboard and easel at one end of said easel and being adapted to lie in the plane of said backboard when in inoperative position, a locking tongue formed from the body of said easel adapted to hold said easel member in mount supporting position, said locking tongue being integral with said backboard and lying against said second board and being supported thereby.

2. In a display mount or the like constructed of lightweight flexible stock, a backboard, a second board constituting a support for a picture or the like extending over the face of said backboard and being substantially coextensive therewith, means joining said backboard and second board about the margins of said boards, a unitary mount supporting easel member formed in said backboard for angular movement about a line integrally joining said backboard and said easel, a locking tongue formed from the body of said easel adapted to hold said easel in mount supporting position, said easel and said locking tongue being adapted to lie in the plane of said backboard when in operative position, and means fixing said tongue to said second board, whereby said locking tongue is supported.

3. In a picture mount or the like constructed of lightweight flexible stock, a backboard, an intermediate board extending over the face of said backboard providing a picture support and being substantially coextensive therewith, a flexible binding member extending about the marginal edges of said backboard and intermediate board joining said boards about said margins whereby warping of said mount is avoided, a faceboard having a picture display window therein overlying the edges of said binding member and being attached to the face of said intermediate member, a unitary mount supporting easel member formed in said backboard for angular movement about a line integrally joining said backboard and said easel, a locking tongue formed from said easel adapted to rest against said second board while holding said easel in mount supporting position, said easel and said locking tongue being adapted to lie in the plane of said backboard when in inoperative position, and said locking tongue lying against said second board and being supported thereby.

4. In a display mount or the like constructed of lightweight flexible stock, a backboard, an intermediate member extending over the face of said backboard and being substantially coextensive therewith to provide support for a picture or the like, a flexible member extending about the marginal edges of said backboard and said second member joining said members about their margins and terminating on the face of said intermediate member, display matter attached to the face of said second member and extending over the exposed edges of said flexible member to conceal the same, a unitary mount supporting easel member formed in said backboard for angular movement about a line integrally joining said backboard and said easel, a locking tongue formed from said easel adapted to rest against said intermediate member while holding said easel member in mount supporting position, said easel member and said locking tongue being adapted to lie in the plane of said backboard when in inoperative position, and means joining said tongue to said second member.

5. In a display mount or the like constructed of lightweight flexible stock, a backboard, a second board extending over the face of said backboard to provide support for a picture or like indicia, a decorative flexible member extending about marginal edges of said backboard and said second board, joining said boards at the margins thereof, a unitary mount-supporting easel member formed in said backboard along lines which extend from a point above the transverse center line of said backboard to a transverse line joining said last-named lines near the bottom of the backboard and forming the free end of the easel, said easel member being adapted for angular movement about a line in the plane of said backboard located at the upper end of said easel member, a locking tongue formed from said easel adapted to rest against and secure support from said second board while holding said easel member in mount supporting position, said easel member and said locking tongue being adapted to lie in the plane of said backboard when in inoperative position.

CARROLL N. CROSS.